(12) United States Patent
Chia et al.

(10) Patent No.: US 10,712,544 B2
(45) Date of Patent: Jul. 14, 2020

(54) LENS ASSEMBLY FOR A VIDEOCONFERENCING SYSTEM

(71) Applicant: Logitech Europe S.A., Lausanne (CH)

(72) Inventors: Hsu Ting Chia, Hsinchu (TW);
Ying-Hsiu Lin, New Taipei (TW)

(73) Assignee: Logitech Europe S.A., Lausanne (CH)

( * ) Notice: Subject to any disclaimer, the term of this patent is extended or adjusted under 35 U.S.C. 154(b) by 34 days.

(21) Appl. No.: 16/004,421

(22) Filed: Jun. 10, 2018

(65) Prior Publication Data

US 2019/0377165 A1    Dec. 12, 2019

(51) Int. Cl.
*G02B 15/14* (2006.01)
*G02B 15/15* (2006.01)
*H04N 7/15* (2006.01)
*G02B 13/18* (2006.01)
*G02B 7/10* (2006.01)

(52) U.S. Cl.
CPC ............... *G02B 15/15* (2013.01); *G02B 7/10* (2013.01); *G02B 13/18* (2013.01); *G02B 15/145129* (2019.08); *H04N 7/15* (2013.01)

(58) Field of Classification Search
USPC .......................... 359/676, 677, 683, 684, 685
See application file for complete search history.

(56) References Cited

U.S. PATENT DOCUMENTS

| | | | |
|---|---|---|---|
| 5,042,927 A | 8/1991 | Ogawa et al. | |
| 6,137,638 A | 10/2000 | Yamagishi et al. | |
| 6,940,656 B2 | 9/2005 | Oomura et al. | |
| 2010/0202053 A1* | 8/2010 | Toyoda | G02B 15/173 359/557 |
| 2012/0314298 A1* | 12/2012 | Ota | G02B 15/173 359/683 |

* cited by examiner

*Primary Examiner* — Darryl J Collins
(74) *Attorney, Agent, or Firm* — Kilpatrick Townsend & Stockton LLP

(57) ABSTRACT

This disclosure describes a videoconferencing system that includes a lens housing having a longitudinal axis; a lens assembly disposed within the lens housing along the longitudinal axis and comprising from front to rear: first, second, third, fourth and fifth lens groups. The lens groups are aligned with and distributed along the longitudinal axis. The videoconferencing system also includes a first motor coupled to and configured to move the second lens group along the longitudinal axis between the first and third lens groups; and a second motor coupled to and configured to move the fourth lens group along the longitudinal axis between the third and fifth lens groups.

10 Claims, 7 Drawing Sheets

Wide FOV

Tele FOV

LENS ASSEMBLY FOR A VIDEOCONFERENCING SYSTEM

BACKGROUND

Modern consumer electronic devices have made carrying out many everyday tasks such as checking the weather or the latest sports scores very straight forward. Unfortunately, high cost commercial systems such as videoconferencing systems often lag behind the more common modern consumer electronic devices in features and ease of use. For example, a vast majority of videoconferencing systems only support the transmission and receipt of 720p or 1080p video streams. Furthermore, these types of systems can be incredibly difficult to use and setup often requiring specialists to be trained on their use and upkeep.

For at least these reasons, improvements in videoconferencing systems are desirable.

SUMMARY

This disclosure describes various embodiments that relate to compact zoom lens assemblies suitable for use with a videoconferencing system.

A videoconferencing system is disclosed and includes the following: a lens assembly housing defining a front opening; an imaging sensor; a lens assembly disposed within the lens assembly housing and comprising: first, second, third, fourth and fifth lens groups, the fifth lens group being adjacent to the imaging sensor and the first lens group being adjacent to the front opening; a first motor coupled to and configured to move the second lens group between the first and third lens groups; and a second motor coupled to and configured to move the fourth lens group between the third and fifth lens groups.

An imaging device is disclosed and includes the following: a lens assembly, from front to rear comprising: a first lens group of positive refractive power; a second lens group of negative refractive power; a third lens group of positive refractive power; a fourth lens group of positive refractive power; and a fifth lens group of positive refractive power. A focal length of the first lens group is greater than a focal length of the fifth lens group, which is greater than a focal length of the third lens group, which is greater than a focal length of the fourth lens group, which is greater than a focal length of the second lens group.

A videoconferencing system is described and includes the following: a cylindrical lens housing defining a front opening and having a longitudinal axis; a lens assembly disposed within the cylindrical lens housing along the longitudinal axis and comprising: a first lens group having a focal length of 112 mm, a second lens group having a focal length of −10 mm, a third lens group having a focal length of 93 mm, a fourth lens group having a focal length of 16 mm, and a fifth lens group having a focal length of 102 mm. The lens groups are aligned with and distributed along the longitudinal axis, the first lens group being adjacent to the front opening and the fifth lens group being disposed within an opening defined by an interior-facing surface of a rear wall of the cylindrical housing.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Aspects of the present disclosure relate generally to optics for imaging devices, and in particular to optics suitable for use with videoconferencing devices, according to certain embodiments.

In the following description, various embodiments of a small form-factor imaging device will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Compact, high-resolution zoom lens assemblies can help bring high quality imagery to a relatively small form factor device. Simply increasing the resolution of an imaging sensor without commensurately improving the quality of the optics supporting that imaging sensor may only result in higher bandwidth streams of imagery. An overall quality of the lens should be designed so that each pixel of the imaging sensor can be resolved. In today's market where $2k$ and $4k$ video are becoming more common, keeping a small form factor and overall cost of the zoom lens assembly competitive while also resolving the additional detail made possible by higher density image sensors is challenging.

One solution described herein is to utilize a zoom lens with five lens groups where at least some of the groups include aspherical lens elements. While the below disclosure describes the device using the zoom lens assembly as part of a videoconferencing system, the videoconferencing term should be construed broadly and could also refer to a webcam or action camera. Use of the described zoom lens assembly with other imaging system types such as DSLRs, mirrorless and cinema cameras should also be deemed to be within the scope of contemplated use.

These and other embodiments are discussed below with reference to FIGS. 1-6; however, those skilled in the art will readily appreciate that the detailed description given herein with respect to these figures is for explanatory purposes only and should not be construed as limiting.

Figure 1:
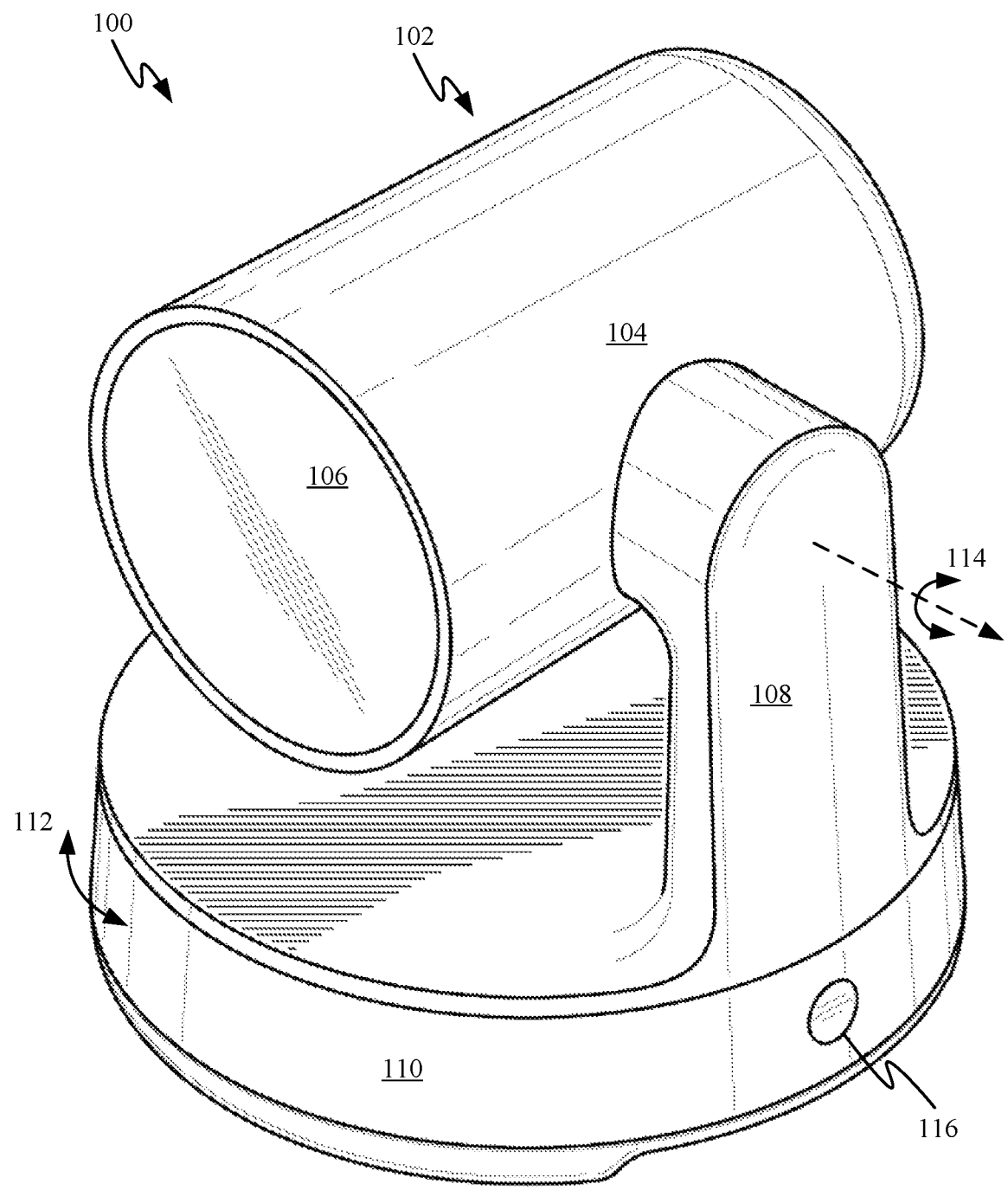
FIG. 1 shows a perspective view of an exemplary videoconferencing system suitable for use with the described embodiments.

FIG. 1 shows a perspective view of an exemplary videoconferencing system 100 suitable for use with the described embodiments. Videoconferencing system 100 includes a lens housing 102 enclosing a lens assembly. Lens housing 102 can include a cylindrical member 104 formed from metal or polymeric materials and a protective cover 106. Protective cover 106 can have a negligible amount of magnification and be optically clear to allow the lens assembly within lens housing 102 to operate without substantial degradation. In some embodiments, protective cover 106 can be sealed to cylindrical member 104 to prevent moisture from intruding into an interior volume defined by lens housing 102. An arm 108 supports lens housing 102 above a base 110. In some embodiments, base 110 can be constructed from multiple parts allowing a portion of base 110 to rotate in directions 112 in order to change an azimuth of lens housing 102. In some embodiments, an azimuth motor can be configured to rotate base 110 a total of 360 degrees. In other embodiments, the azimuth motor may be limited to rotating base 110 a total of 180 degrees. Videoconferencing system 100 can also include an inclination motor for rotating lens housing 102 about axis of rotation 114. In some embodiments, the inclination motor can be disposed within base 110 and includes gearing that transmits force generated by the inclination motor through arm 108 to rotate lens housing 102 about axis of rotation 114. Base 110 also includes a plug receptacle 116 for receiving power and/or sending video signal data. For example, plug receptacle 116 could take the form of a USB plug receptacle or a power plug receptacle. In some embodiments, videoconferencing system 100 can be both powered and exchange data through a plug engaged with plug receptacle 116.

Figure 2A:
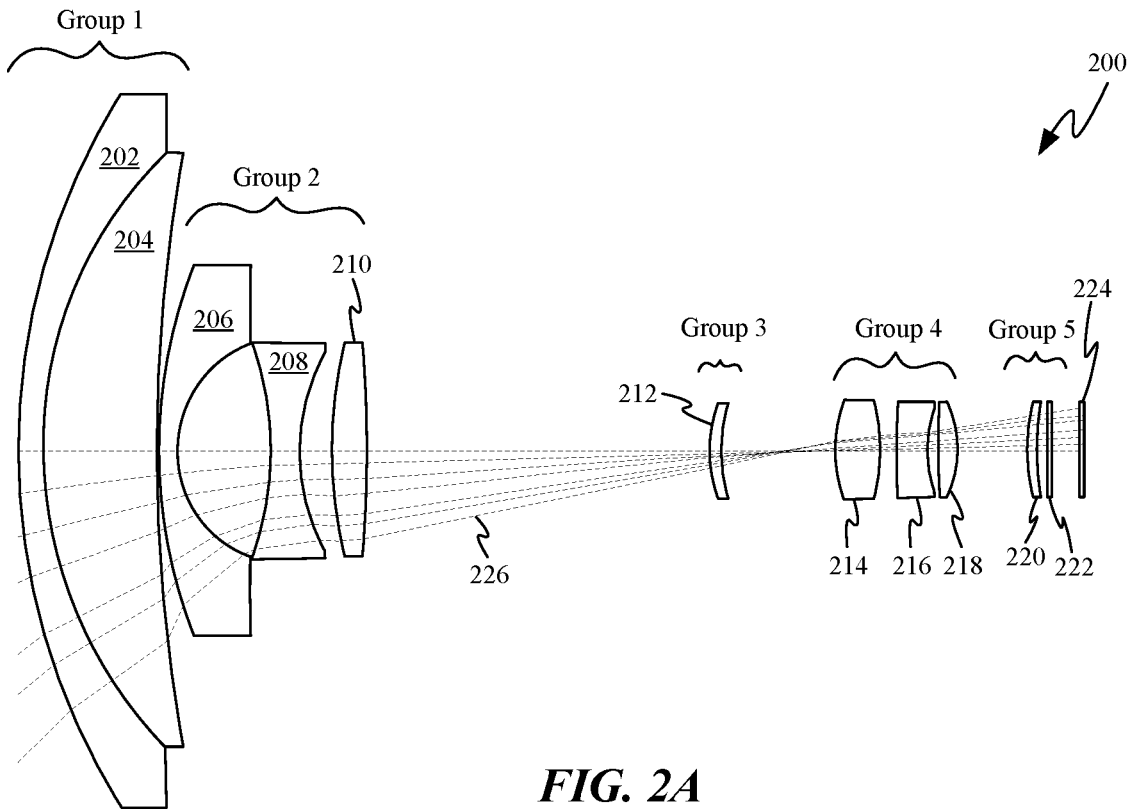
FIG. 2A shows a cross-sectional view of lens elements making up a lens assembly with movable lens groups in position to minimize an overall focal length of the lens assembly.
Figure 2B:
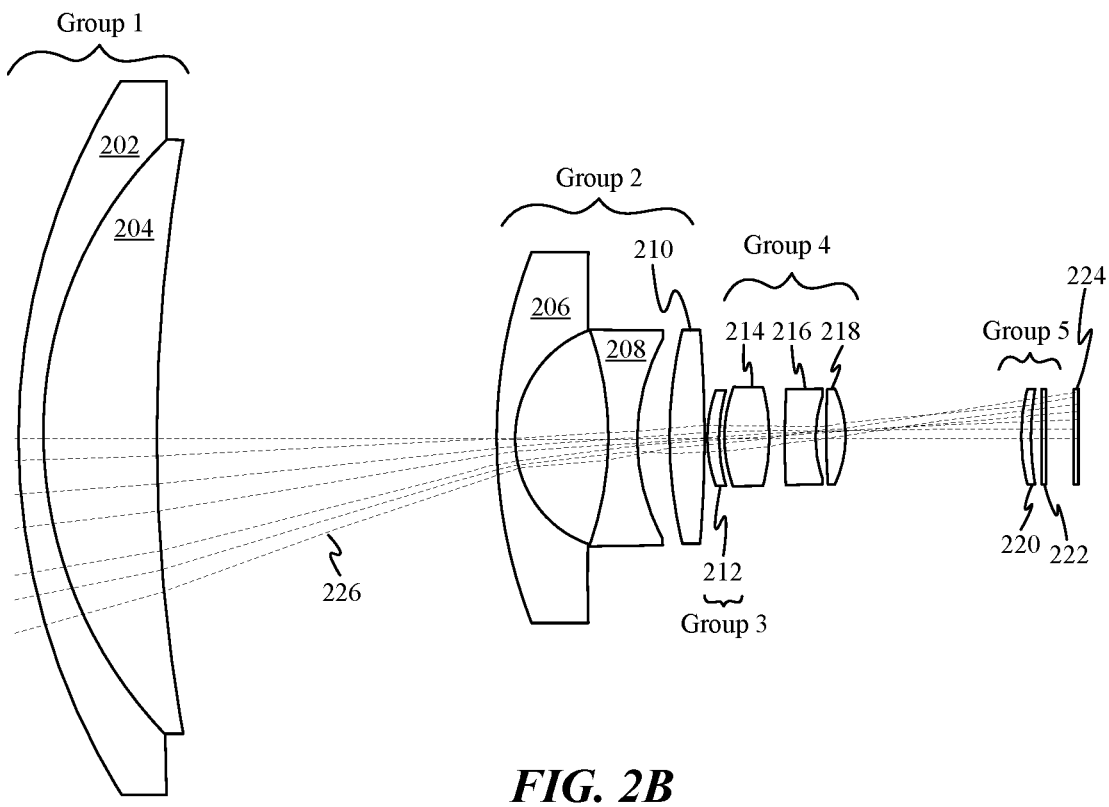
FIG. 2B shows a cross-sectional view of lens elements making up the lens assembly depicted in FIG. 2A with movable lens groups in position to maximize an overall focal length of the lens assembly.

FIGS. 2A-2B shows cross-sectional views of lens elements making up a lens assembly 200 capable of covering a range of different focal lengths. FIG. 2A shows the lens elements positioned to minimize an overall focal length of lens assembly 200. Lens assembly 200 is made up of from front to back lens groups 1-5. Lens group 1 includes a meniscus-shaped negative lens element 202 and a positive lens element 204, which can both be formed from glass. Lens element 202 can be adhesively coupled to lens element 204. In some embodiments, liquid optically clear adhesive (LOCA) can be used to adhere lens elements 202 and 204 together without negatively affecting optical performance. In some embodiments, lens elements 202 and 204 can be compressed together without adhesively coupling the two lens elements together. Lens group 2 is a moveable lens group shown in close proximity to lens group 1 and includes lens elements 206, 208 and 210. Lens element 206 is a negative lens, lens element 208 is an aspherical negative lens in bi-concave form and lens element 210 is a positive lens. Lens group 3 includes only a single lens element, lens element 212. Lens element 212 is an aspherical positive lens that can be formed from polymeric materials.

FIG. 2A also depicts lens group 4, another moveable group that includes lens elements 214, 216 and 218. Lens element 214 is an aspherical positive lens element in bi-convex form. In some embodiments, lens element 214 can be formed from molding glass, which can improve performance and thereby improve the ability of lens group 4 to achieve sharp focus. Lens element 216 is a negative lens with a greater index of refraction than lens elements 214 and 218. Lens element 218 is a positive lens. Lens group 5 includes lens elements 220 and 222. Lens element 220 is a slightly positive lens and lens element 222 has negligible magnification and includes an infrared light blocking coating preventing most infrared light from reaching a digital sensor 224. In some embodiments, the infrared coating can block 98-99% of light having a wavelength between 700 nm and 1000 nm. This IR filter coating can prevent degraded image capture performance caused by IR light being incorrectly captured and presumed to be visible light. It should be noted that in some embodiments, IR filter coating could instead be added to one surface of lens element 220 removing the need for lens element 222. IR filter coating could also take other forms such as a film layer adhered to one side of lens element 222 or lens element 220. For the purpose of this description, a positive lens is a lens having positive refractive power resulting in magnification of an image and a negative lens is a lens having negative refractive power resulting in reduction of an image.

FIG. 2A also shows light represented by dashed lines 226 representing one half of the light entering lens assembly 200 and reaching digital sensor 224. Dashed lines 226 illustrate pathways of light entering lens assembly 200 and show how placing lens group 2 in a forward position helps gather light across a wide field of view and redirect the light to digital sensor 224. In some embodiments, digital sensor 224 can take the form of a CMOS or CCD imaging sensor.

FIG. 2B shows a cross-sectional view of the lens elements making up the lens assembly depicted in FIG. 2A with movable lens groups 2 and 4 in position to maximize an overall focal length of lens assembly 200. By moving lens group 2 away from lens group 1, the amount of light entering through a periphery of a front surface of lens element 202 and ultimately arriving at digital sensor 224 is substantially reduced. In this way, a larger effective focal length for lens assembly 200 is achieved. While lens group 4 is also shown in a different position, it should be appreciated that the position of lens group 4 can be primarily associated with a focus distance of lens assembly 200. In some embodiments, movement of group 2 can only effect focal length and movement of group 4 can only effect focus distance. In some embodiments, a position of lens group 4 may have to change with a changing position of lens group 2 to maintain the same focus distance. When lens assembly is used to follow a moving person a position of lens group 4 may change quickly to follow a position of and keep the moving person in focus. It should be noted that an overall focal length of lens assembly 200 can vary from 3.726 mm to 18 mm and that in some embodiments, the image circle produced by lens assembly 200 can be about 7.4 mm in diameter. An aperture of videoconferencing system 100

Table (1) depicted below shows various other exemplary technical features of lens assembly 200 in the two positions depicted in FIGS. 2A and 2B. It should be noted that other designs, materials and other technical features may vary and the below technical specifications should not be construed as limiting.

TABLE (1)

| Lens Group # | Lens Element (Indicia) | Lens Material | Index of Refraction | Focal Length (mm) | Group Focal Length (mm) | Lens or Air Gap thickness at centerline for FIG. 2A (mm) | Lens or Air Gap thickness at centerline for FIG. 2B (mm) |
|---|---|---|---|---|---|---|---|
| 1 | 1 (202) | Glass | 1.8466 | −116.565 | 112.184 | 2.025 | 2.025 |
| 1 | 2 (204) | Glass | 1.8061 | 55.3743 | 112.184 | 9.938 | 9.938 |
| N/A | Air Gap | N/A | 1 | N/A | N/A | 0.25 | 29.752 |
| 2 | 3 (206) | Plastic | 1.806 | −16.1212 | −10.4969 | 1.662 | 1.662 |
| N/A | Air Gap | N/A | 1 | N/A | N/A | 8.057 | 8.057 |
| 2 | 4 (208) | Glass | 1.5292 | −15.0996 | −10.4969 | 2.096 | 2.096 |
| N/A | Air Gap | N/A | 1 | N/A | N/A | 3.056 | 3.056 |
| 2 | 5 (210) | Glass | 1.8466 | 32.0956 | −10.4969 | 2.987 | 2.987 |
| N/A | Air Gap | N/A | 1 | N/A | N/A | 29.691 | 0.188 |
| 3 | 6 (212) | Plastic | 1.5445 | 92.6445 | 92.6446 | 0.93 | 0.93 |
| N/A | Air Gap | N/A | 1 | N/A | N/A | 9.913 | 0.687 |
| 4 | 7 (214) | Molding Glass | 1.5831 | 12.0045 | 15.5856 | 3.817 | 3.817 |
| N/A | Air Gap | N/A | 1 | N/A | N/A | 1.507 | 1.507 |
| 4 | 8 (216) | Glass | 1.8466 | −11.9043 | 15.5856 | 2.514 | 2.514 |
| N/A | Air Gap | N/A | 1 | N/A | N/A | 0.972 | 0.972 |
| 4 | 9 (218) | Glass | 1.497 | 16.9728 | 15.5856 | 1.688 | 1.688 |
| N/A | Air Gap | N/A | 1 | N/A | N/A | 5.873 | 15.1 |
| 5 | 10 (220) | Glass | 1.497 | 102.482 | 102.482 | 0.809 | 0.809 |
| N/A | Air Gap | N/A | 1 | N/A | N/A | 1 | 1 |
| 5 | 11 (222) | Glass (IR Cut) | 1.5168 | 100000 | 102.482 | 0.8 | 0.8 |
| N/A | Sensor | N/A | N/A | N/A | N/A | 2.365 | 2.365 |

Table (1) shows characteristics of each of lens elements 202-222. In particular, lens material, an index of refraction of the lens material and a focal length of the lens element are shown for each lens element. Next, focal lengths of each lens element and lens group are depicted. Finally, a relative thickness at a centerline or longitudinal axis of the lens assembly as well as a thickness of the air gaps between each of the lens elements is shown in the last two columns of Table 1. In total, the numbers provided account for a total track length (TTL) of 91.95 mm.

Figure 3:
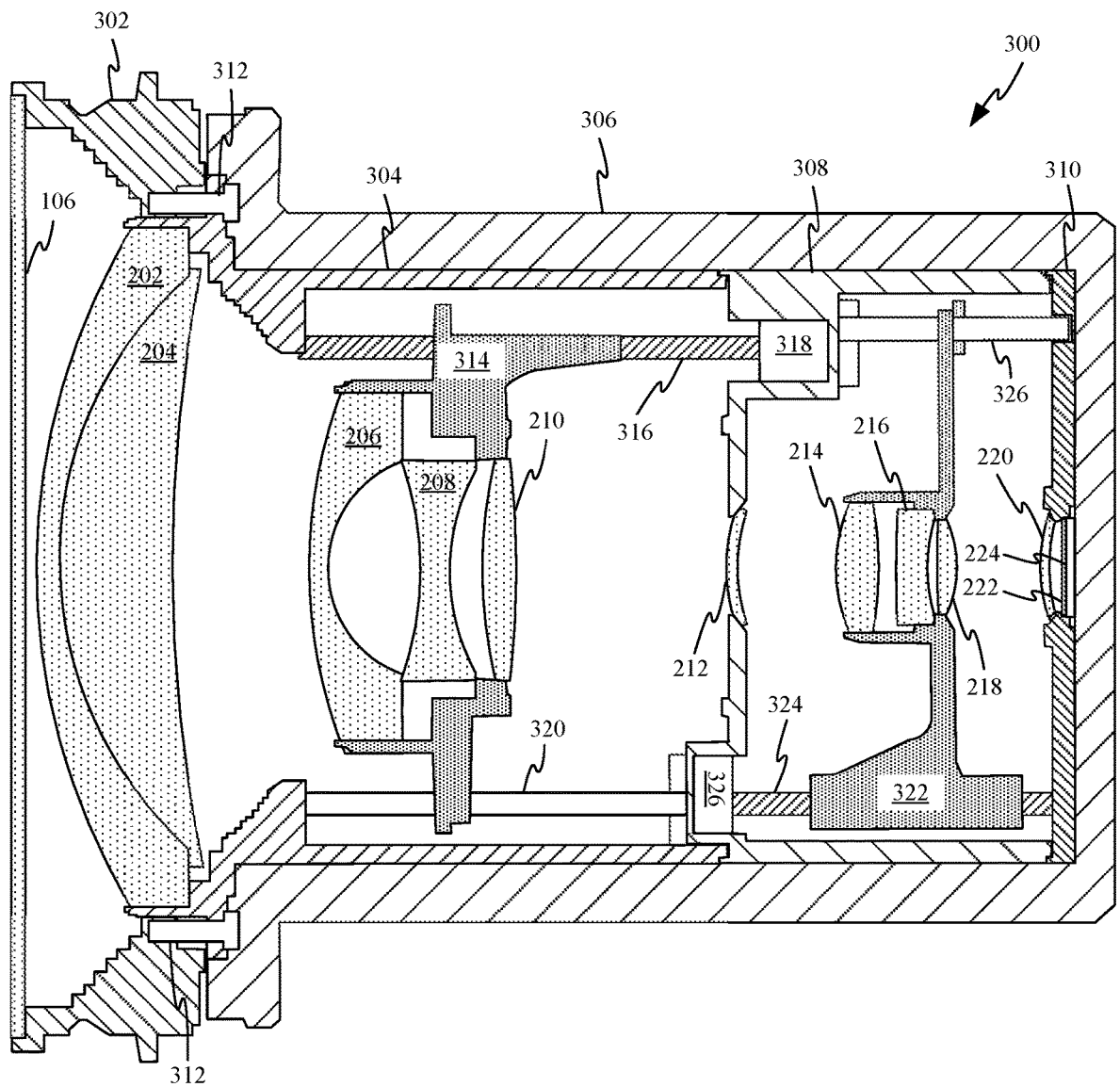
FIG. 3 shows a cross-section view of a lens assembly that illustrates how the lens groups can be positioned within a lens housing.

FIG. 3 shows a cross-sectional view of lens assembly 200 positioned within lens assembly housing 300. As depicted, lens assembly housing 300 can be a multi-part housing that includes hood 302, bezel 304, barrel 306, fixed aperture assembly 308 and lens mount 310. It should be appreciated that a smaller or larger number of parts could be used to form lens assembly housing 300. Fasteners 312 can be configured to secure hood 302, bezel 304 and barrel 306 together. Hood 302 can be formed from optically absorptive materials helping to prevent light from bouncing off hood 302 and into lens assembly 200. Hood 302 can also define a front opening within which protective cover 106 can be secured. Hood 302 and protective cover 106 can cooperatively form an environmental seal that prevents dust and/or other contaminates from entering into lens assembly 200. Bezel 304 can define a front lens opening having a size and shape suitable for receiving the first lens group that includes lens elements 202 and 204. Positioned in this manner, lens elements 202 and 204 can provide support for the forward end of lens assembly housing 300. Lens group 2, which includes lens elements 206-210 can be held in place by a first lens holder 314. Lens holder 314 can define a threaded aperture that interacts with threaded stud 316 to maneuver lens holder 314 and lens group 2 within lens assembly housing 300. Zoom motor 318 can be configured to rotate threaded stud 316, resulting in the movement of lens holder 314. Lens holder can also define a second opening through which rod 320 extends to help keep lens holder 314 axially stabilized within lens assembly housing 300 during movement of lens holder 314.

In some embodiments, lens holder 314 can be stabilized by multiple rods 320 distributed radially within lens assembly housing 300.

FIG. 3 also shows fixed aperture assembly 308, which provides a mount upon which lens element 212 can be positioned. Fixed aperture assembly 308 can have an annular geometry and be optically opaque so as to lower the likelihood of stray light passing into and arriving at a photosensitive surface of digital sensor 224. Fixed aperture assembly 308 also defines a lens aperture within which lens element 212 is positioned. Mounting lens element 212 within the lens aperture of fixed aperture assembly 308 fixes a position of lens element 212 precisely within lens assembly housing 300. A second lens holder 322 is depicted holding lens group 4, which includes lens elements 214-218. Second lens holder 322 can be maneuvered within lens assembly housing 300 by rotation of threaded stud 324 by focus motor 326. This rotation generates movement of lens holder 322 by virtue of threaded stud 324 extending through a threaded aperture defined by lens holder 322. Similar to lens holder 314, lens holder 322 can be stabilized by one or more rods 324, which help keep lens holder centered along a longitudinal axis defined by lens assembly housing 300. Lens mount 310 can be in direct contact with a portion of fixed aperture assembly 308 and define a central opening within which lens elements 220 and 222 of lens group 5 can be disposed. In this way, lens group 5 can be held in place by a rear wall of lens assembly housing 300. Digital sensor 224 can be positioned directly beneath lens element 222, as depicted. It should be noted that while not depicted in FIG. 3, lens assembly housing 300 could be enclosed by a lens housing similar to or the same as lens housing 102 of videoconferencing system 100 as depicted in FIG. 1.

Figure 4A:
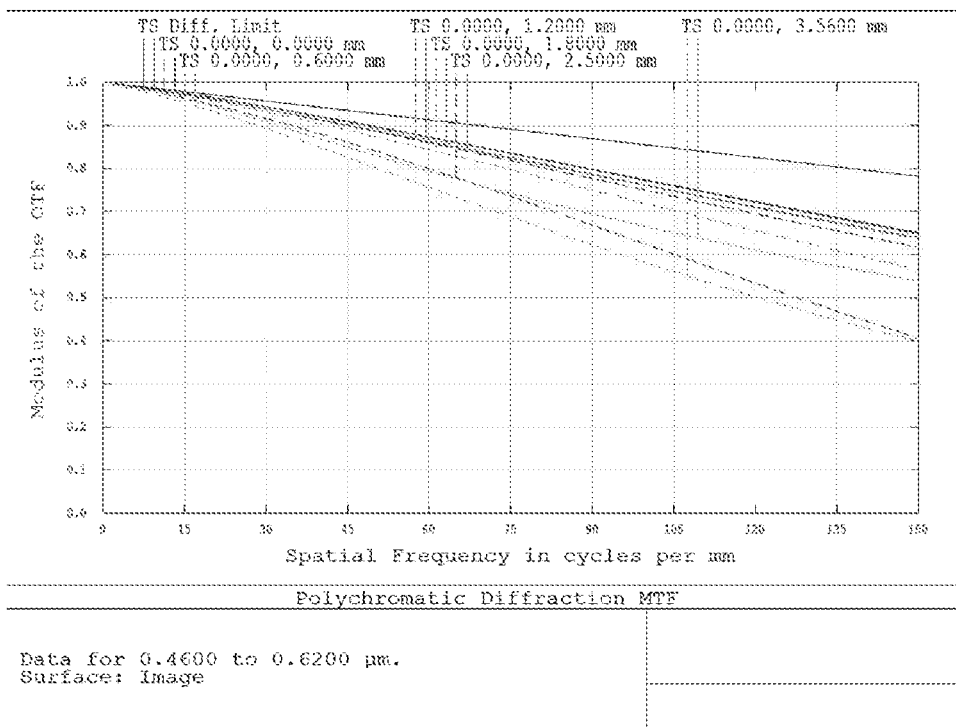
FIGS. 4A-4B show modulation transfer function (MTF) charts for respective wide and telephoto focal lengths of the lens assembly depicted in FIG. 3.
Figure 4B:
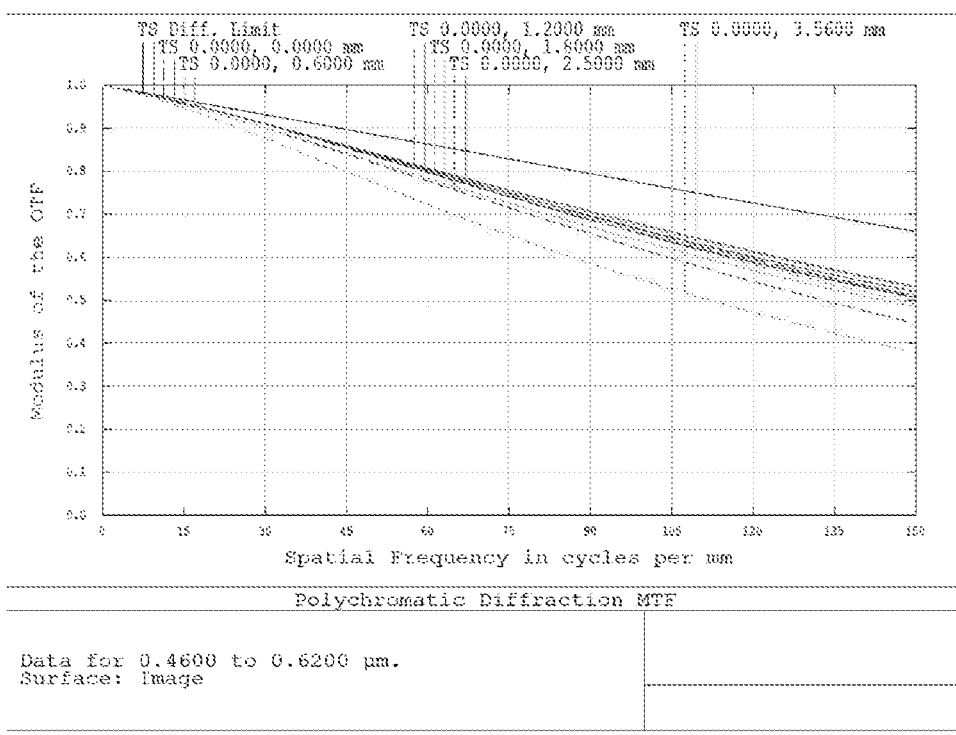

FIGS. 4A-4B show MTF charts for respective wide and telephoto focal lengths of lens assembly 200. FIGS. 4A-4B show data indicative of the high resolution capabilities of lens assembly 200. While performance is excellent at both the wide and telephoto ends of the zoom range, performance is slightly better at the wide end for lens assembly 200.

Figure 5A:
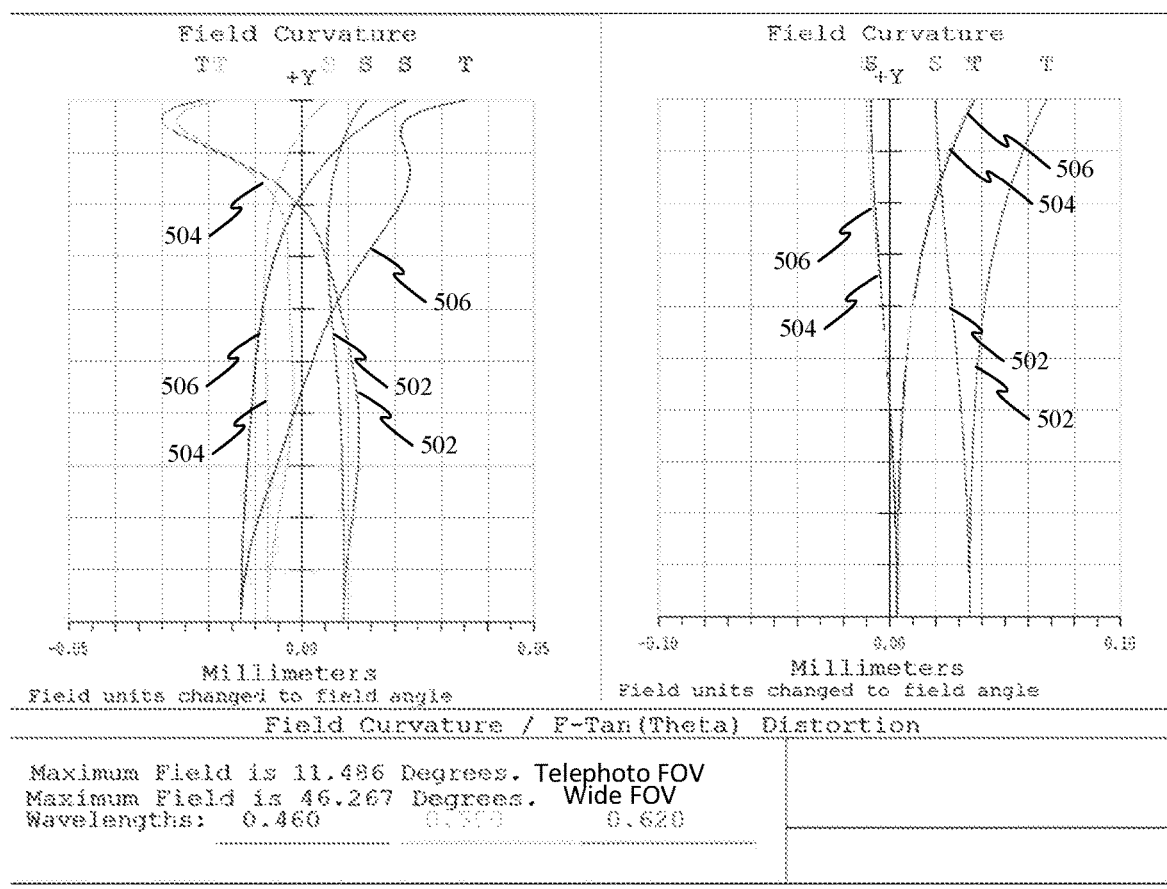
FIG. 5A shows sagittal and tangential field curvature lines representing change in field curvature across a field of view of the lens assembly depicted in FIGS. 2A-3 for respective wide and telephoto ends of the zoom range for the lens assembly.
Figure 5B:
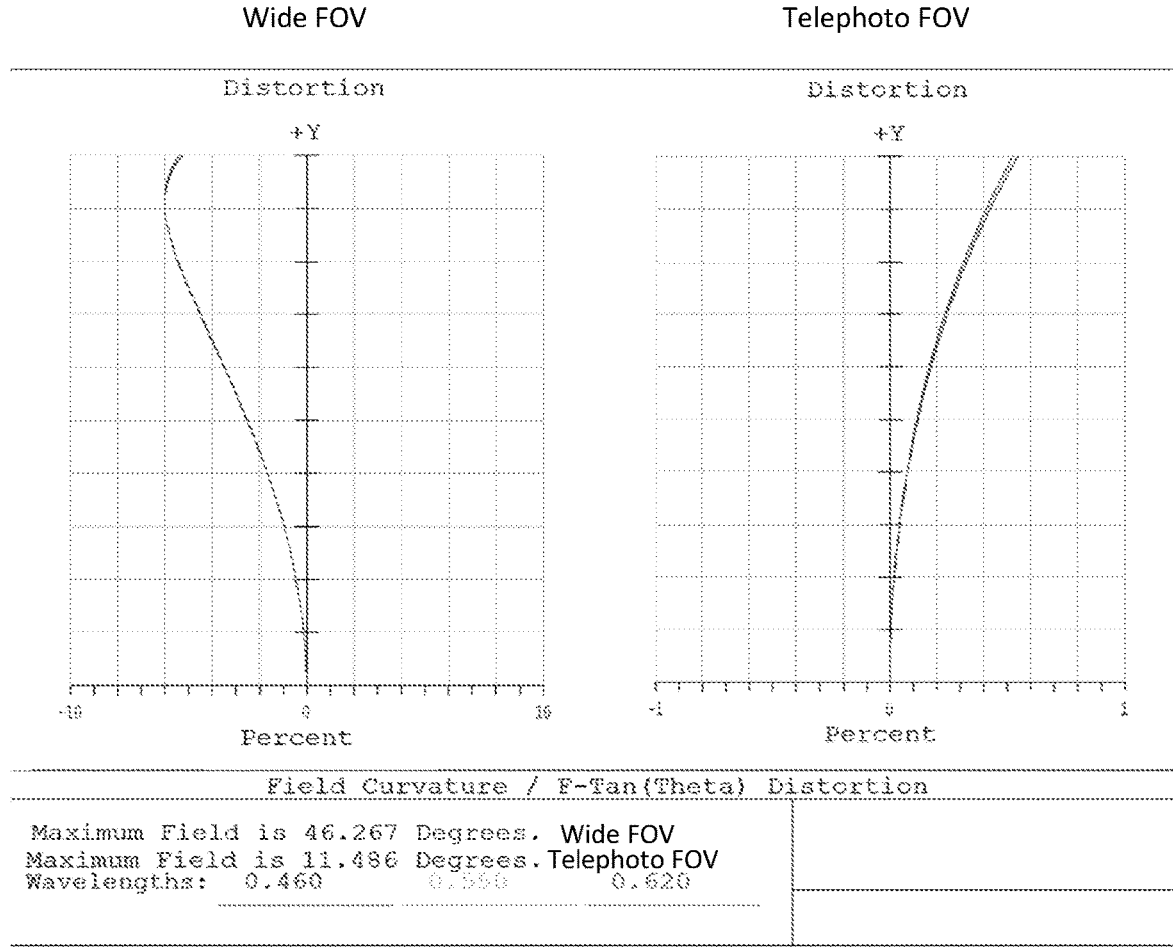
FIG. 5B shows how, distortion at the wide end of the lens assembly is substantially larger than at the telephoto.

FIG. 5A shows sagittal and tangential field curvature lines representing change in field curvature across a field of view of lens assembly 200 for respective wide and telephoto ends of the zoom range for lens assembly 200. These graphs show that the telephoto end of the zoom range has less variation in field curvature but that the total amount of field curvature is about the same. In particular, the field curvature varies by color with lines 502 (representing red at a wavelength of 620 nm) being offset from lines 504 (representing green at a wavelength of 550 nm) and lines 506 (representing blue at a wavelength of 460 nm). FIG. 5B shows how distortion at the wide end is substantially larger at an extreme of about −6% than at the telephoto end where the distortion is about 0.75%. In some embodiments, videoconferencing system 100 can include software algorithms for doing real-time distortion correction to prevent participants arranged around a periphery of the field of view from appearing distorted.

Examples of Systems for Operating Videoconferencing Devices

Figure 6:
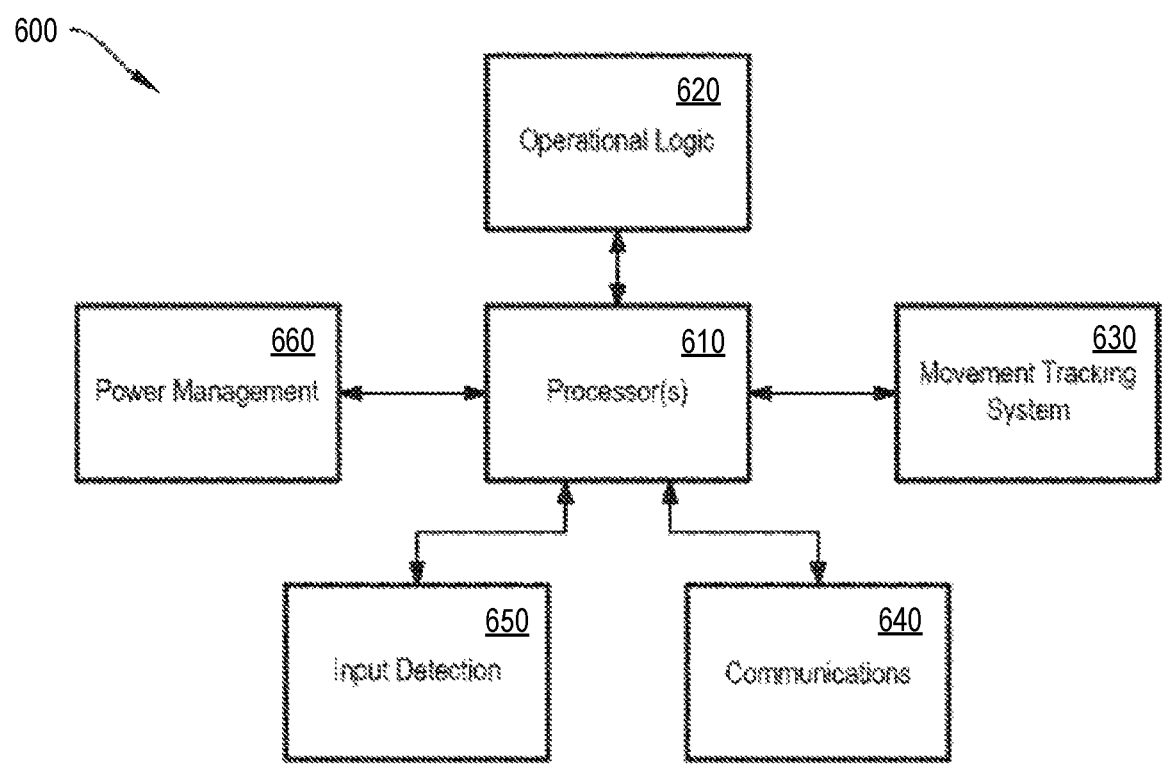
FIG. 6 is a simplified block diagram of a system configured to operate a videoconferencing system, according to certain embodiments.

FIG. 6 is a simplified block diagram of a system 600 configured to operate videoconferencing system 100, according to certain embodiments. System 600 includes processor(s) 610, operational logic 620, movement tracking system 630, input detection system 650, and power management system 660. Each of system blocks 620-660 can be in electrical communication with the processor(s) 610. System 600 may further include additional systems that are not shown or discussed to prevent obfuscation of the novel features described herein.

In certain embodiments, processor(s) 610 can include one or more microprocessors (μCs) and can be configured to control the operation of system 600. Alternatively, processor(s) 610 may include one or more microcontrollers (MCUs), digital signal processors (DSPs), or the like, with supporting hardware and/or firmware (e.g., memory, programmable I/Os, etc.), as would be appreciated by one of ordinary skill in the art. In some embodiments, multiple processors may provide an increased performance in system 600 speed and bandwidth. It should be noted that although multiple processors may improve system 600 performance, they are not required for standard operation of the embodiments described herein.

Operational logic 620 can include any combination of software, firmware, or hardware that can perform the various steps, operations, and functions associated with videoconferencing system 100, as described above with respect to FIGS. 1-5B. For instance, operational logic 620 can control settings and operating parameters such as recording resolution, focus, magnification and lens assembly azimuth and inclination. Operational logic 620 can be stored in any suitable non-transitory computer-readable storage media that can store program code and/or data that provide the functionality of embodiments of the present disclosure. That is, operational logic 620 can store one or more software programs to be executed by processors (e.g., in processor(s) 610). It should be understood that "software" can refer to sequences of instructions that, when executed by processing unit(s) (e.g., processors, processing devices, etc.), cause system 600 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations described herein. In some embodiments, the memory associated with operational logic 620 can include RAM, ROM, solid-state memory, magnetic or optically-based memory systems, removable media (e.g., "thumb drives," SD cards, flash-based devices), or other types of storage media known in the art. One of ordinary skill in the art would understand the many variations, modifications, and alternative embodiments thereof.

Movement tracking system 630 can be configured to track a movement of participants in a videoconferencing session. In certain embodiments, one or more optical or auditory sensors can be used for movement and active speaker determination. Optical sensors can take the form of infrared sensors for tracking movement toward and away from the videoconferencing device and auditory sensors can take the form of one or more directional microphones for identifying an active speaker. For example, movement tracking system 630 can provide movement data to a host computer to control magnification and orientation of an imaging device. Movement tracking system 630 can report movement information to processor(s) 610.

Communications system 640 can be configured to provide wireless communication between videoconferencing system 100 and a host computing device, according to certain embodiments. Communications system 640 can employ any suitable wireless communication protocol including, but not limited to Bluetooth®-based communication protocols (e.g., BLE), IR, ZigBee®, ZWire®, Wi-Fi (IEEE 802.11), Thread, Logi® protocols, or other suitable communication technology to facilitate wireless bidirectional communication between videoconferencing system 100 and a host computing device. System 600 may optionally comprise a hardwired connection to a host computing device. For example, videoconferencing device 100 can be configured to receive a Universal Serial Bus (e.g., USB-C) cable to enable bidirectional electronic communication between videoconferencing device 100 and a host computing device. Some embodiments may utilize different types of cables or connection protocol standards to establish hardwired communication with other entities.

Input detection system 650 can be configured to detect a touch or touch gesture on one or more buttons, touch sensitive surfaces, or the like, on videoconferencing system 100. Input detection system 650 can include one or more touch sensitive surfaces, touch sensors, buttons, controls, or other user interface, as would be understood by one of ordinary skill in the art. Touch sensors generally comprise sensing elements suitable to detect a signal such as direct contact, electromagnetic or electrostatic fields, or a beam of electromagnetic radiation. Touch sensors can be configured to detect at least one of changes in the received signal, the presence of a signal, or the absence of a signal.

Power management system 660 can be configured to manage power distribution, recharging, power efficiency, and the like, for videoconferencing 100. In some embodiments, power management system 660 can include a battery (not shown), a USB based recharging system for the battery (not shown), power management devices, and a power grid within system 600 to provide power to each subsystem (e.g., accelerometers, gyroscopes, etc.). In certain embodiments, the functions provided by power management system 660 may be incorporated into processor(s) 610. The power source can be a replaceable battery, a rechargeable energy storage device (e.g., super capacitor, Lithium Polymer Battery, NiMH, NiCd), or a corded power supply (e.g., via USB-C port—see FIG. 1). One of ordinary skill in the art would understand the many variations, modifications, and alternative embodiments thereof.

It should be appreciated that system 600 is illustrative and that variations and modifications are possible. System 600 can have other capabilities not specifically described here (e.g., mobile phone, global positioning system (GPS), power management, one or more cameras, various connection ports for connecting external devices or accessories, etc.). Further, while system 600 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software. Furthermore, aspects and/or portions of system 600 may be combined with or operated by other sub-systems as required by design. For example, operational logic 620 may operate within processor(s) 610 instead of functioning as a separate entity. The foregoing embodiments are not intended to be limiting and those of ordinary skill in the art with the benefit of this disclosure would appreciate the myriad applications and possibilities.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A videoconferencing system, comprising:
   a lens assembly housing defining a front opening;
   an imaging sensor;
   a lens assembly disposed within the lens assembly housing and comprising:
      a first lens group comprising a first lens element coupled to a second lens element;
      a second lens group comprising third, fourth, and fifth lens elements, the third lens element having one or more aspherical surfaces;
      a third lens group comprising a sixth lens element disposed within a fixed aperture and having one or more aspherical surfaces;
      a fourth lens group comprising seventh, eighth and ninth lens elements, the seventh lens element having one or more aspherical surfaces and being formed from molding glass; and
      a fifth lens group, the fifth lens group comprising tenth and eleventh lens elements, the eleventh lens element including an IR filter,
      wherein the fifth lens group is adjacent to the imaging sensor, and
      wherein the first lens group is adjacent to the front opening;
   a first motor coupled to and configured to move the second lens group between the first and third lens groups; and
   a second motor coupled to and configured to move the fourth lens group between the third and fifth lens groups.

2. The videoconferencing system as recited in claim 1, wherein the first lens element has an index of refraction of 1.8, the second lens element has an index of refraction of 1.8, the third lens element has an index of refraction of 1.8, the fourth lens element has an index of refraction of 1.5, the fifth lens element has an index of refraction of 1.8, the sixth lens element has an index of refraction of 1.5, the seventh lens element has an index of refraction of 1.6, the eighth lens element has an index of refraction of 1.8, the ninth lens element has an index of refraction of 1.5, the tenth lens element has an index of refraction of 1.5 and the eleventh lens element has an index of refraction of 1.5.

3. The videoconferencing system as recited in claim 1, wherein the lens assembly has an aperture of f2 at a wide end of a zoom range of the lens assembly and f3.1 at a telephoto end of the zoom range.

4. The videoconferencing system as recited in claim 1, wherein the first lens group has a focal length of 112 mm, the second lens group has a focal length of −10 mm, the third lens group has a focal length of 93 mm, the fourth lens group has a focal length of 15 mm and the fifth lens group has a focal length of 102 mm.

5. The videoconferencing system as recited in claim 1, further comprising a digital sensor, wherein the fifth lens group is disposed within an opening defined by a rear wall of the lens assembly housing and is positioned adjacent to the digital sensor.

6. An imaging device, comprising:
   a lens assembly, from front to rear comprising:
      a first lens group of positive refractive power;
      a second lens group of negative refractive power;
      a third lens group of positive refractive power;
      a fourth lens group of positive refractive power; and a fifth lens group of positive refractive power, wherein a focal length of the first lens group is greater than a focal length of the fifth lens group, which is greater than a focal length of the third lens group, which is greater than a focal length of the fourth lens group, which is greater than a focal length of the second lens group, wherein the second and fourth lens groups are movable lens groups and the second lens group is capable of moving over three times farther than the fourth lens group, wherein movement of the second lens group changes an overall effective focal length of the lens assembly, and wherein the third lens group is separated from the first lens group by a first distance and wherein the third lens group is separated from the fifth lens group by a second distance, and a ratio of the first distance to the second distance is greater than 3:2.

7. The imaging device as recited in claim 6, wherein movement of the fourth lens group adjusts a focus distance of the lens assembly.

8. The imaging device as recited in claim 6, further comprising one or more sensors and a processor configured to receive data from the one or more sensors and to adjust a focal length and focus of the lens assembly in accordance with the data received from the one or more sensors.

9. A videoconferencing system, comprising:

a cylindrical lens housing defining a front opening and having a longitudinal axis;

a lens assembly disposed within the cylindrical lens housing along the longitudinal axis and comprising:

a first lens group having a focal length of 112 mm, a second lens group having a focal length of −10 mm, a third lens group having a focal length of 93 mm, a fourth lens group having a focal length of 16 mm, and a fifth lens group having a focal length of 102 mm, wherein each of the lens groups are aligned with and distributed along the longitudinal axis, the first lens group being adjacent to the front opening and the fifth lens group being disposed within an opening defined by an interior-facing surface of a rear wall of the cylindrical housing, and wherein the first and third lens elements of the fourth lens group have a positive refractive power and the second lens element of the fourth lens group has a negative refractive power; and a focus motor configured to move the fourth lens group by rotating a threaded stud that interacts with a lens holder securing first, second and third lens elements of the fourth lens group together.

10. The videoconferencing system as recited in claim 9, wherein the second lens group is a movable lens group coupled to a zoom motor, the second lens group comprising first, second and third lens elements, the first lens element having one or more aspherical surfaces.

* * * * *